United States Patent
Silbermann et al.

(10) Patent No.: US 11,084,200 B2
(45) Date of Patent: Aug. 10, 2021

(54) SILICONE EXTRUSION PLANT, METHOD FOR SILICONE EXTRUSION AND SILICONE EXTRUDATE PRODUCED HEREWITH

(71) Applicant: Raumedic AG, Münchberg (DE)

(72) Inventors: Martin Silbermann, Kirchenlamitz (DE); Florian Bär, Helmbrechts (DE)

(73) Assignee: Raumedic AG, Münchberg (DE)

(*) Notice: Subject to any disclaimer, the term of this patent is extended or adjusted under 35 U.S.C. 154(b) by 671 days.

(21) Appl. No.: 15/837,916

(22) Filed: Dec. 11, 2017

(65) Prior Publication Data

US 2018/0162012 A1  Jun. 14, 2018

(30) Foreign Application Priority Data

Dec. 9, 2016 (DE) ...................... 10 2016 224 607.0

(51) Int. Cl.
*B29C 48/285* (2019.01)
*B29C 48/92* (2019.01)
(Continued)

(52) U.S. Cl.
CPC .............. *B29C 48/285* (2019.02); *B28B 3/22* (2013.01); *B28B 13/02* (2013.01);
(Continued)

(58) Field of Classification Search
CPC . B29C 48/022; B29C 48/2552; B29C 48/285; B29C 48/29; B29C 48/92; B29C 2948/92019; B29C 2948/92333; B29C 2948/92371; B29C 2948/92514; B29C 2948/92828; B29C 2948/92866;
(Continued)

(56) References Cited

U.S. PATENT DOCUMENTS 3,183,533 A * 5/1965 Kull ....................... B21K 27/04
                                                            470/139
3,538,203 A * 11/1970 Fricke ................. B29C 44/3442
                                                             264/53
(Continued)

FOREIGN PATENT DOCUMENTS

AT          413 965         7/2006
DE         37 12 828       11/1988
(Continued)

*Primary Examiner* — Jeffrey M Wollschlager
(74) *Attorney, Agent, or Firm* — Boyle Fredrickson S.C.

(57) ABSTRACT

A silicone extrusion plant has a silicone extruder and a silicone feed device configured to load the silicone extruder. The silicone feed device has a feed hopper. The feed hopper opens into a feed opening at the bottom thereof. The feed opening is in a fluidic connection, via a feed duct, with an inlet zone of the silicone extruder. A feed screw arranged in the feed hopper in such a way as to be drivable for rotation protrudes into the feed opening at least partly. The feed screw has a cone portion and a cylinder portion. According to another aspect, the silicone extrusion plant has at least one feed pressure sensor configured to measure an actual feed pressure of silicone material to be extruded. A control unit is in a signal communication with the feed pressure sensor and a feed drive device in order to drive the silicone feed device.

9 Claims, 6 Drawing Sheets

(51) Int. Cl.
- *B29C 48/00* (2019.01)
- *B29C 48/255* (2019.01)
- *B29C 48/29* (2019.01)
- *B28B 3/22* (2006.01)
- *B28B 13/02* (2006.01)
- *B28B 17/00* (2006.01)
- *B29K 83/00* (2006.01)

(52) U.S. Cl.
CPC ........ *B28B 17/0081* (2013.01); *B29C 48/022* (2019.02); *B29C 48/2552* (2019.02); *B29C 48/29* (2019.02); *B29C 48/92* (2019.02); *B29C 2948/92019* (2019.02); *B29C 2948/92209* (2019.02); *B29C 2948/92333* (2019.02); *B29C 2948/92371* (2019.02); *B29C 2948/92409* (2019.02); *B29C 2948/92514* (2019.02); *B29C 2948/92828* (2019.02); *B29C 2948/92866* (2019.02); *B29K 2083/00* (2013.01)

(58) Field of Classification Search
CPC .......... B29C 2948/92209; B29C 2948/92409; B92K 2083/00; B29K 208/005; B29K 2083/005; B29K 2883/00; B29K 2883/005; B29K 2083/00; B28B 3/22; B28B 13/02; B28B 17/0081
See application file for complete search history.

(56) References Cited

U.S. PATENT DOCUMENTS

| | | | | | |
|---|---|---|---|---|---|
| 3,633,494 | A | * | 1/1972 | Schippers | B29C 48/03 222/408 |
| 3,634,574 | A | * | 1/1972 | Reinking | B29C 48/29 264/211.23 |
| 3,773,586 | A | * | 11/1973 | Koch | B29B 17/0042 156/193 |
| 3,860,220 | A | * | 1/1975 | Matsubayashi | B29C 48/38 366/86 |
| 3,920,229 | A | * | 11/1975 | Piggott | B29C 48/286 366/76.2 |
| 4,117,073 | A | * | 9/1978 | Koch | B29C 48/288 264/349 |
| 4,228,005 | A | * | 10/1980 | Covington, Jr. | B01D 21/009 210/207 |
| 4,290,986 | A | * | 9/1981 | Koschmann | G05D 23/1934 264/40.3 |
| 4,764,020 | A | * | 8/1988 | Moriyama | B29B 7/487 366/76.4 |
| 4,789,507 | A | * | 12/1988 | Wesley | D01D 1/09 264/29.2 |
| 5,259,749 | A | * | 11/1993 | Meixner | B29B 7/72 425/205 |
| 5,662,415 | A | * | 9/1997 | Gisko | B29B 7/845 366/139 |
| 6,391,234 | B1 | * | 5/2002 | Silvi | B01F 13/1027 264/101 |
| 2005/0006813 | A1 | * | 1/2005 | Yamane | B02C 18/148 264/211.21 |
| 2006/0234033 | A1 | * | 10/2006 | Nishikawa | B29B 7/823 428/314.8 |
| 2010/0295207 | A1 | * | 11/2010 | Thewes | B29C 48/2886 264/211.23 |

FOREIGN PATENT DOCUMENTS

| | | |
|---|---|---|
| DE | 20 2013 100 631 | 6/2013 |
| DE | 10 2011 122 935 | 12/2015 |
| EP | 0 470 510 | 2/1992 |
| WO | 2005039847 | 5/2005 |

* cited by examiner

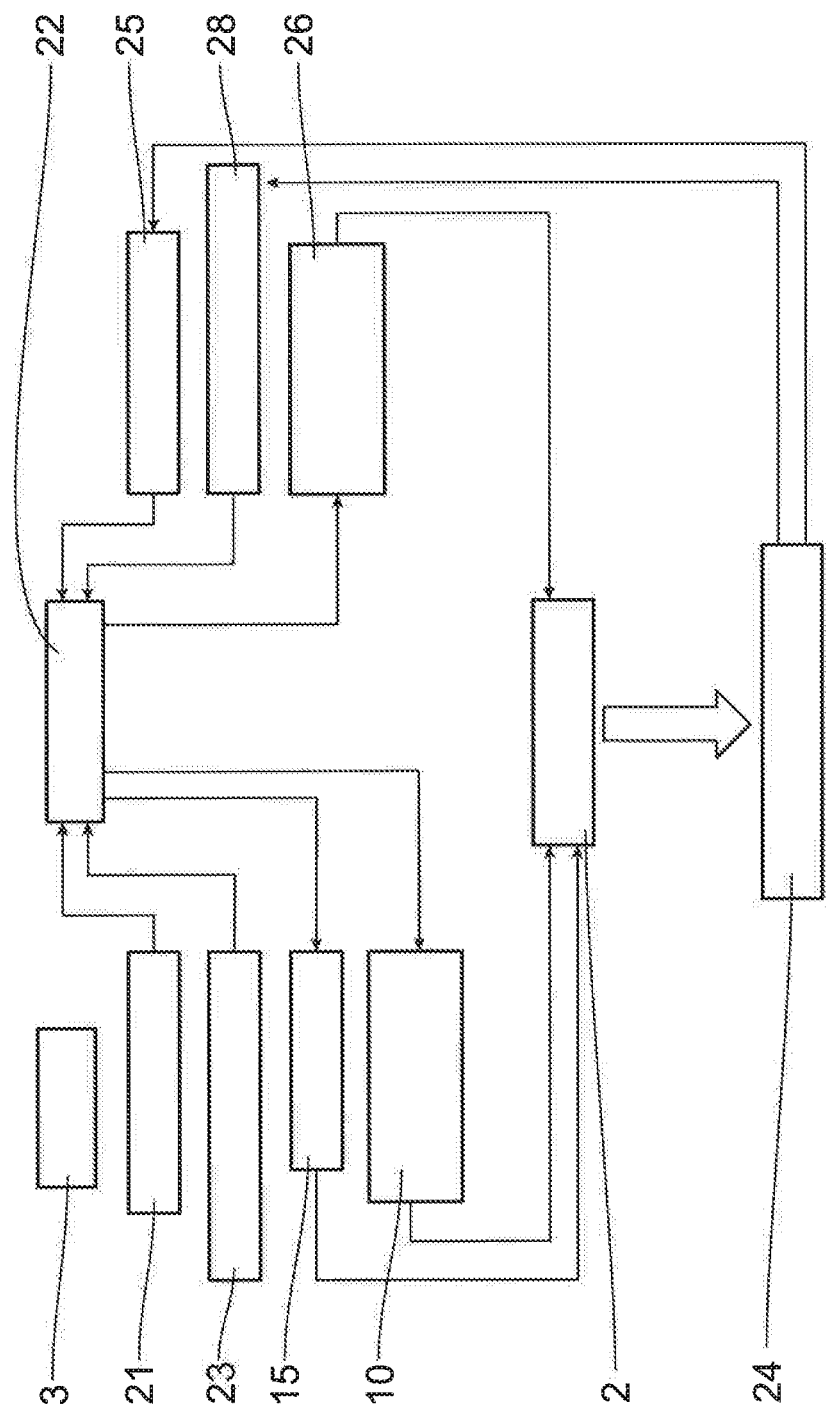

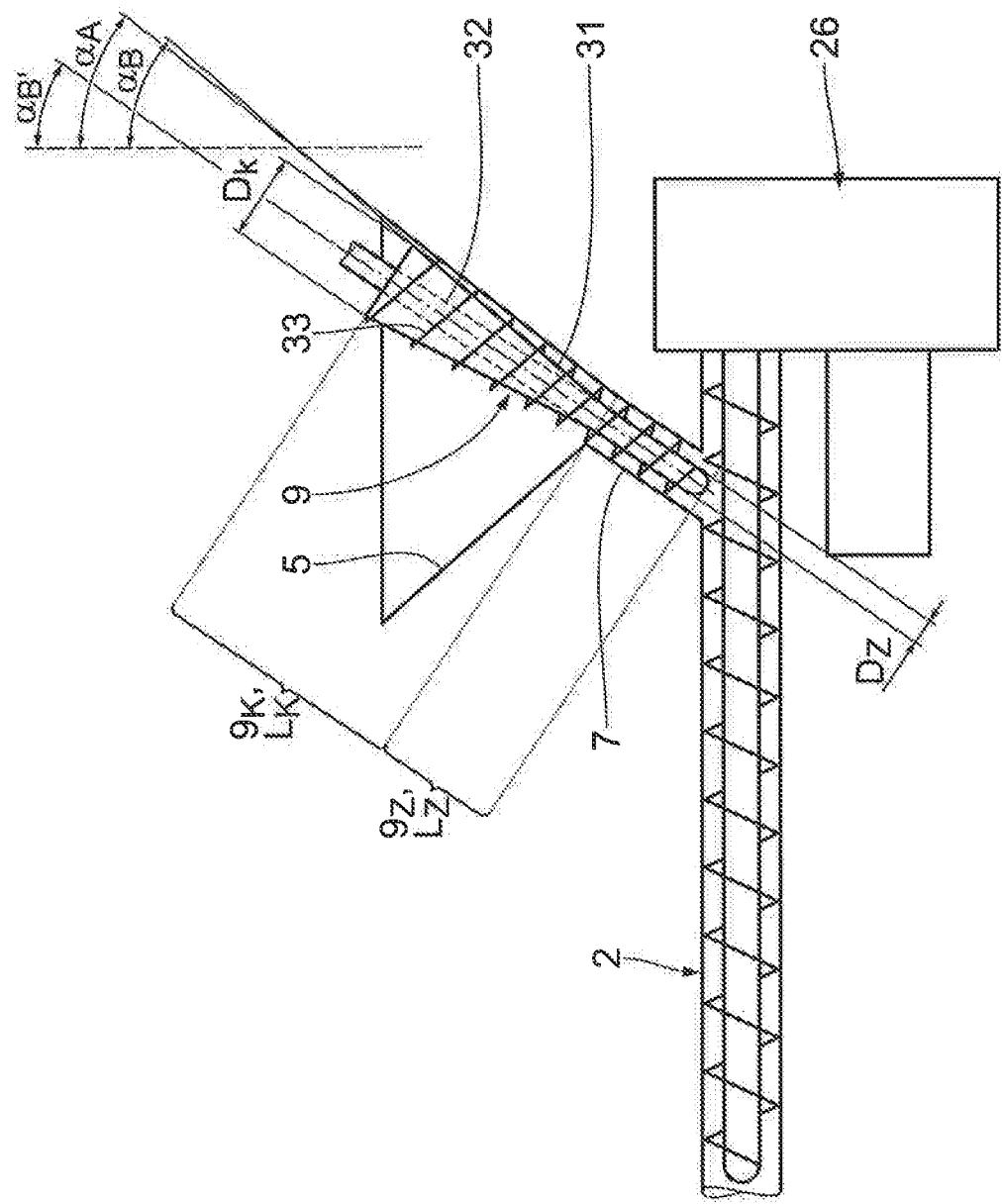

SILICONE EXTRUSION PLANT, METHOD FOR SILICONE EXTRUSION AND SILICONE EXTRUDATE PRODUCED HEREWITH

CROSS-REFERENCE TO RELATED APPLICATIONS

This application claims priority of German Patent Application Serial No. 10 2016 224 607.0, filed on Dec. 9, 2016, pursuant to 35 U.S.C. (a)-(d), the content of which is incorporated herein by reference in its entirety as if fully set forth herein.

FIELD OF THE INVENTION

The invention relates to a silicone extrusion plant. The invention further relates to a method for silicone extrusion to be carried out using a silicone extrusion plant of this type, and to a silicone extrudate produced with an extrusion method of this type.

BACKGROUND OF THE INVENTION

A silicone extruder is known from WO 2005/039847 A1.

SUMMARY OF THE INVENTION

An object of the present invention is to further develop a silicone extruder in such a way that it is usable for the mass production of silicone extrudate.

This object is resolved in accordance with a first aspect of the invention by a silicone extrusion plant comprising a silicone extruder, a silicone feed device configured to load the silicone extruder, the silicone feed device having a feed hopper, which opens into a feed opening disposed at the bottom thereof, the feed opening being in a fluidic connection, via a feed duct, with an inlet zone of the silicone extruder, a feed screw arranged in the feed hopper in such a way as to be drivable for rotation, the feed screw protruding into the feed opening at least partly, with parts of the feed screw being designed such as to have a conical envelope, with parts of the feed screw being designed such as to have a cylindrical envelope and in accordance with a second aspect of the invention by a silicone extrusion plant comprising a silicone extruder, a silicone feed device configured to load the silicone extruder, at least one feed drive device configured to drive the silicone feed device, at least one feed pressure sensor configured to measure an actual feed pressure of silicone material to be extruded, the feed pressure sensor being arranged in a transition region between the silicone feed device and the silicone extruder, a control unit, which is in signal communication with the feed pressure sensor and the feed drive device, configured to define a nominal feed pressure and to transmit an actuating signal to the feed drive device depending on a difference detected between the nominal feed pressure and the actual feed pressure.

In accordance with the first aspect, it was found according to the invention that a loading of the silicone extruder, which is carried out in an automated manner to the greatest possible extent, is a crucial factor for the mass production of an extrudate. A conveyor device, which is already used in a different context, comprising a feed hopper and a feed screw arranged therein surprisingly turned out to be a suitable silicone feed device for loading the silicone extruder. A silicone feed device of this type ensures an operationally safe and continuous loading of the silicone extruder. A manual feeding of silicone into the feed duct is not required. The silicone extruder may be an extruder having a processing length in the range of 15D. It is possible to use a single-screw extruder or a twin-screw extruder. The loading thereof may be performed such that a formation of bubbles is avoided. The feed screw may be arranged at an angle relative to the vertical, said angle corresponding in particular to the cone angle of the feed hopper. Alternatively, in particular if the hopper is arranged at an angle, in other words the hopper axis thereof is not vertical in this case, the longitudinal axis of the feed screw may then also be arranged horizontally. The feed screw having an envelope that is partly conical ensures a particularly efficient and gentle feeding of silicone. The cone portion in particular allows for an alternative thread depth of a screw thread, which may be taken advantage of in order to influence a conveying effect applied to the silicone material by the feed screw. Preferably, a screw portion near the drive end or near the hopper is designed such as to have a conical envelope. The feed screw may be arranged such that the conical envelope portion is disposed in the feed hopper while the cylindrical envelope portion is disposed in the feed duct. The embodiment of the screw having a partly cylindrical envelope ensures a comparatively simple installation in particular in those positions where the screw runs in a portion of the feed duct. The cone portion may have a cylindrical base body so the conical envelope of the cone portion is obtained as a result of a corresponding change in the thread depth of the screw threads.

Arranging the feed screw adjacent to the hopper wall according to the invention proved to be particularly suitable to perform an efficient feeding of silicone. A distance of the feed screw from the hopper wall may be smaller than 1 mm.

A silicone extrusion plant, in which a screw cone angle of the conical envelope portion differs from a hopper cone angle (aa) of the feed hopper, results in an efficient and gentle feeding of silicone in such a way that the silicone material is conveyed through the feed duct homogeneously all the while preventing the formation of undesirable bubbles. An angle deviation of this type provides a degree of flexibility when defining a thread depth of the screw threads along the direction of conveyance of the silicone material. The angular relationship may be such that a thread depth of the screw threads reduces along the cone portion in the direction of conveyance of the silicone material.

A silicone extrusion plant, in which a length ratio $L_K/L_Z$ between the conical envelope portion and the cylindrical envelope portion is in the range of between 1 and 3, proved to be particularly suitable to perform an efficient feeding. This length ratio may be in range of between 1.5 and 2.5, and in particular in the range of between 1.55 and 2.

A silicone extrusion plant, in which the feed hopper is drivable for rotation, further improves the efficiency of a continuous and trouble-free feeding of silicone.

A silicone extrusion plant comprising a feed rotary drive on the one hand and a feed hopper rotary drive on the other, with the rotary drives being configured independently of one another, allows an optimized operating point of the feed device to be defined, in other words an optimized combination of a speed of the feed screw on the one hand and of a speed of the feed hopper on the other, depending on material parameters of the used silicone material to be extruded, in particular depending on the viscosity and the adhesion properties thereof. The use of independent rotary drives further allows unconventional movement patterns, such as non-constant speeds, speed ramps or the like, to be executed. As an alternative to independent rotary drives, a silicone extrusion plant may also be equipped with exactly one drive for both the feed screw and the feed hopper.

A control device being in a signal communication with the rotary drives allows individual feeding programs, for example, to be defined, which are adapted to the respective silicone material to be fed.

According to the second aspect of the invention, it was found that a controlled operation of the silicone extrusion plant improves the result of the extrusion process. In this respect, the maintenance of a constant feed pressure turned out to be particularly advantageous for the result of the extrusion. The silicone feed device of the silicone extrusion plant according to this second aspect may be a feed device comprising a feed screw and a feed hopper as already explained above. Alternatively, the silicone feed device according to this second aspect may also have a different design.

In an embodiment of a silicone extrusion plant, in which at least one feeding temperature sensor configured to measure an actual feeding temperature of the silicone material to be extruded, the feeding temperature sensor being arranged in a transition region between the silicone feed device and the silicone extruder, and the feeding temperature sensor being in signal communication with the control unit, the measured actual feed temperature may also be used to generate or to modify a variable for the feed device.

It turned out that the discharge pressure of the silicone material to be extruded in the region of the tool head is an additional control parameter to optimize the result of the extrusion. This is taken into account by an embodiment of the silicone extrusion comprising at least one tool head pressure sensor configured to measure an actual discharge pressure of silicone material to be extruded, the tool head pressure sensor being arranged in a tool head in the region of a discharge zone of the silicone extruder, with the control unit being in signal communication with the tool head pressure sensor and an extruder drive unit in order to drive an extruder screw, to set a nominal discharge pressure, and to transmit an actuating signal to the extruder drive unit depending on a difference detected between the nominal discharge pressure and the actual discharge pressure.

The advantages of a discharge temperature sensor configured to measure an actual discharge temperature of the silicone material to be extruded, the discharge temperature sensor being arranged in the tool head of the silicone extruder, and the discharge temperature sensor being in signal communication with the control unit, are the same as those already explained above with reference to the feed temperature sensor.

The features of the two aspects of the silicone extrusion plant explained above may be combined with each other as required.

The advantages of a silicone extrusion method comprising the following steps: providing a silicone extrusion plant according to the invention, loading silicone material to be extruded into the silicone feed device, conveying the silicone material through the silicone feed device and the silicone extruder, and discharging the extrudate from the silicone extruder, are the same as those already explained above with reference to the two aspects of the silicone extrusion plant. The same applies to the silicone extrudate produced by means of this extrusion method. The extrudate may be a tube, a hollow profile or a solid profile. A silicone extrudate of this type may in particular be used in medical engineering.

Exemplary embodiments of the invention will hereinafter be explained in more detail, taken in conjunction with the drawing.

BRIEF DESCRIPTION OF THE DRAWINGS

FIG. 5 shows a signal processing diagram during controlled operation of the silicone extrusion plant;

FIG. 6 shows a schematic partial view of another embodiment of a silicone extrusion plant comprising a silicone extruder and a silicone feed device equipped with a feed screw having a conical envelope portion (cone portion) and a cylindrical envelope portion (cylinder portion).

DETAILED DESCRIPTION OF AT LEAST ONE PREFERRED EMBODIMENT

Figure 1:
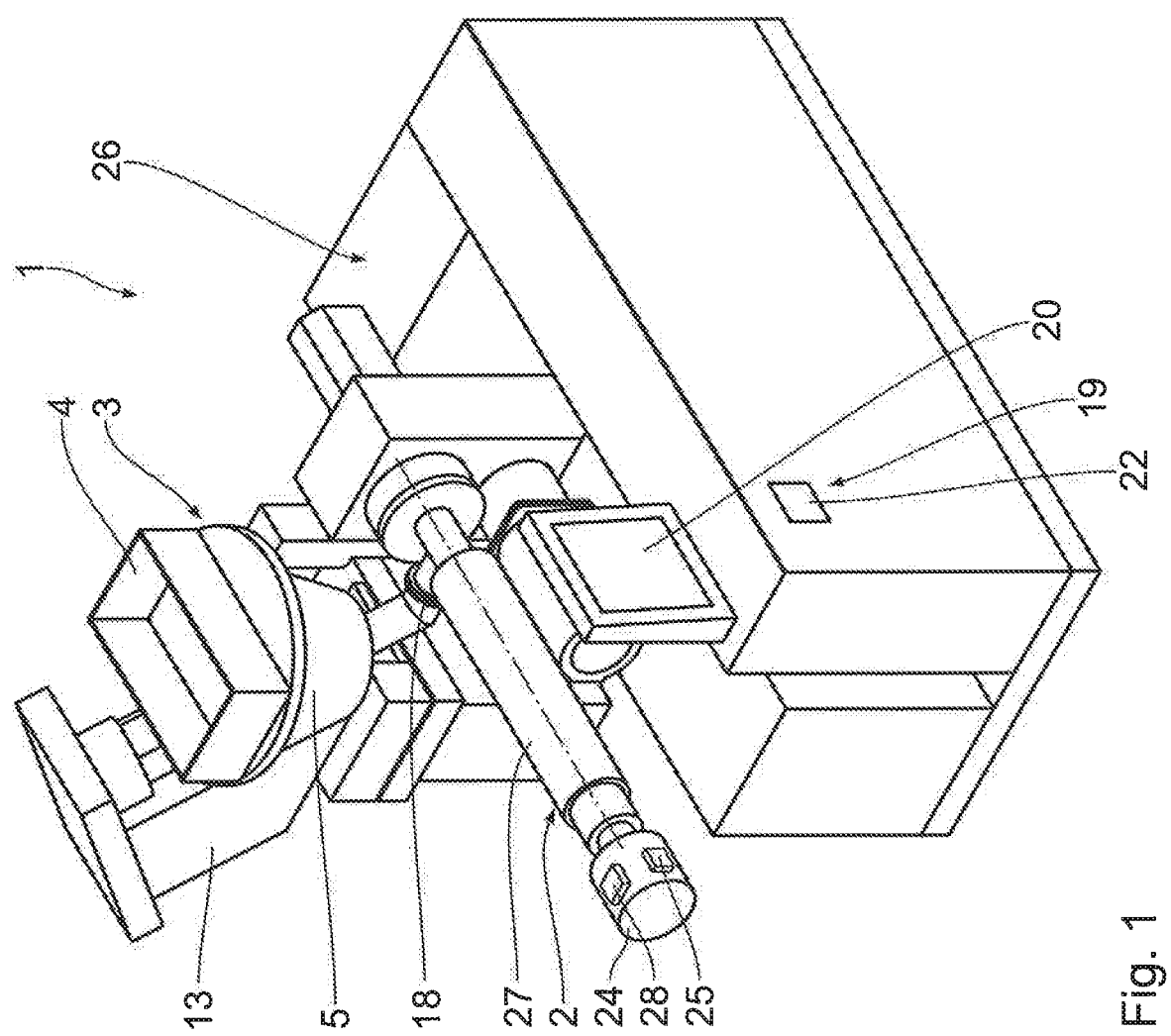
FIG. 1 shows a perspective view of a silicone extrusion plant comprising a silicone extruder and a silicone feed device in a feeding position for loading the silicone extruder with a silicone material to be extruded.

A silicone extrusion plant 1 has a silicone extruder 2 and a silicone feed device 3 for loading the silicone extruder 2 with a silicone material to be extruded. The silicone feed device 3 has an upper feed box 4 that opens into a feed hopper 5 arranged at the bottom thereof. Said feed hopper 5 in turn opens into a feed opening 6 arranged at the bottom thereof. The silicone material feed opening 6 is in a fluidic connection, via a feed duct 7 (see FIG. 3), with an inlet zone 8 of the extruder 2.

Figure 2:
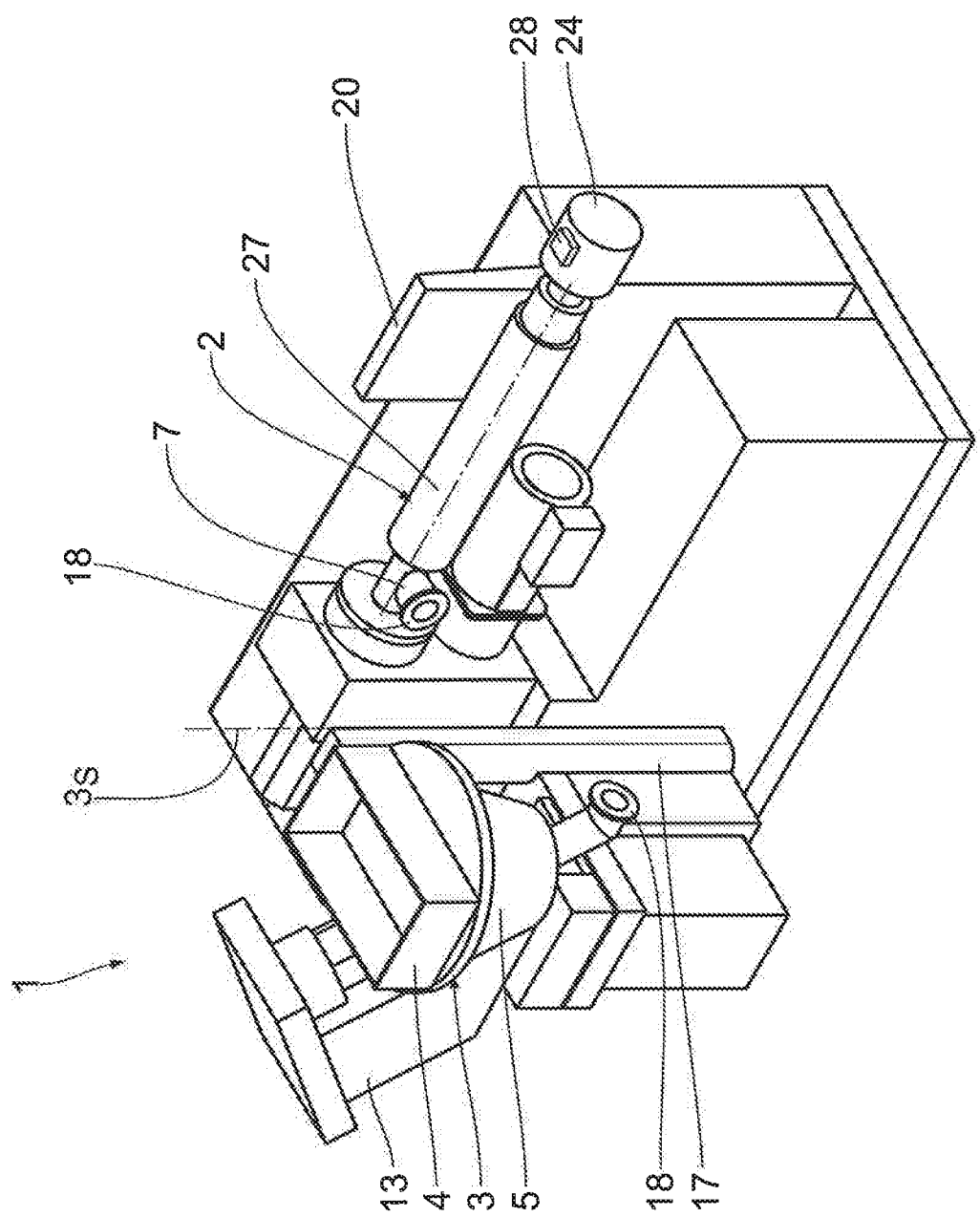
FIG. 2 shows another perspective view of the silicone extrusion plant according to FIG. 1 with the feed device in a cleaning or maintenance position.
Figure 3:
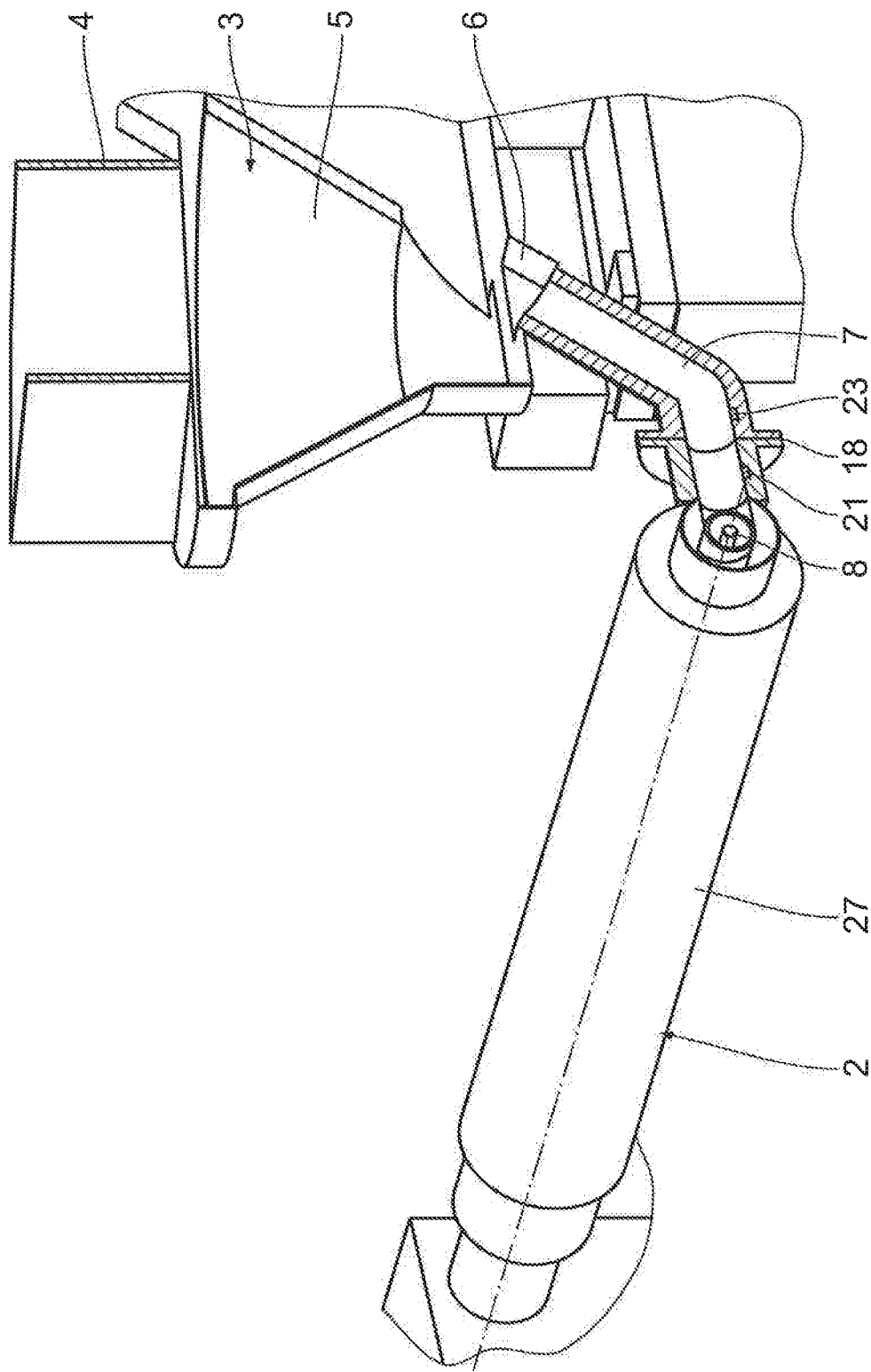
FIG. 3 shows a partly sectional view revealing inner details of a portion of the silicone extrusion plant in the region of a feed duct between a feed hopper of the silicone feed device and an inlet zone of the silicone extruder.
Figure 4:
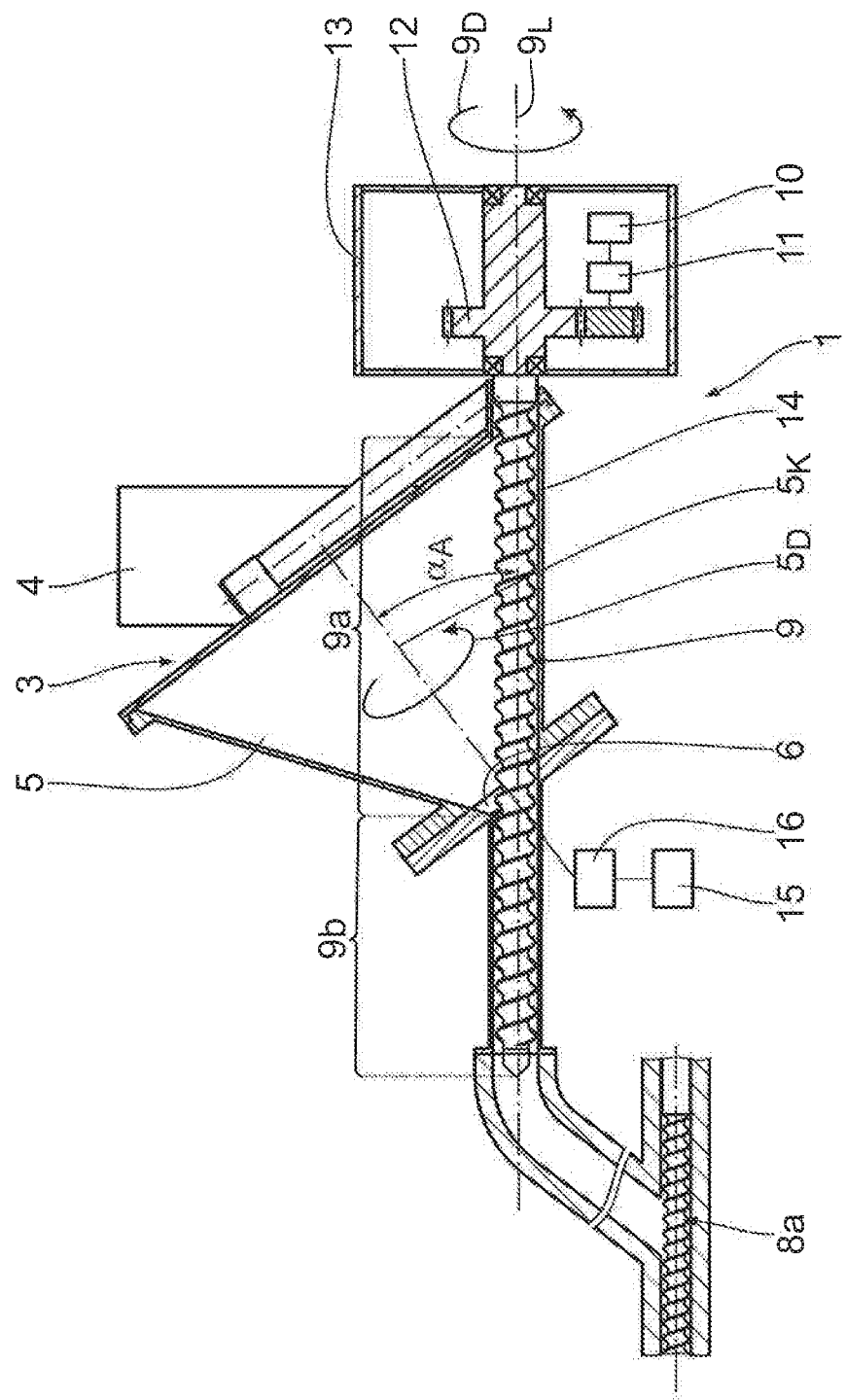
FIG. 4 shows an axial sectional view of another embodiment of the plant with the hopper being arranged at an angle in the region of the silicone feed device, the sectional plane including a symmetry axis of the feed hopper and a longitudinal axis of a feed screw of the feed device, and coinciding—for the sake of clarity—with a longitudinal axis of an extruder screw of the silicone extruder.

FIGS. 1 to 3 show an embodiment of the silicone feed device with an upright feed hopper 5. An alternative embodiment with the feed hopper 5 being arranged at an angle is shown in FIG. 4. Components, which are equal to those of the embodiment according to FIGS. 1 to 3 carry the same reference numerals in FIG. 4 and are not discussed in detail again with reference to FIG. 4 if they have already been described with reference to FIGS. 1 to 3.

The extruder 2 is designed such as to have a processing length of 15D. This means that an effective length of an extruder screw 8 (see FIG. 4) is 15 times the size of a diameter of the extruder screw 8a. Generally speaking, the processing length may be in the range of between 8D and 20D, particularly between 10D and 15D.

The silicone extruder 2 may be configured as single-screw extruder or as a twin-screw extruder.

Part of the silicone feed device 3 is formed by a feed screw 9 (see FIG. 4). For the sake of clarity, the extruder screw 8a is shown in a partial axial sectional view in FIG. 4. Usually, the longitudinal axes of the extruder screw 8a on the one hand and of the feed screw 9 on the other are not disposed in a common plane in the silicone extrusion plant 1.

The feed screw 9 partly protrudes into the feed opening 6, in other words it is disposed in a screw portion 9a of the feed hopper near the drive end thereof and in a screw portion 9b of the feed duct 7 near the inlet end thereof. The screw portion 9 near the drive end is designed such as to have an envelope that tapers conically in the direction of the feed opening 6. The screw portion 9b near the inlet end has a cylindrical envelope.

The feed screw 9 is drivable for rotation. For this purpose, a feed screw rotary drive 10 is used, which acts—via a gear unit 11—on a drive gearwheel 12 that is non-rotationally connected to the feed screw 9. Instead of a gear unit, it is conceivable as well to use a belt drive to ensure a force transmission between the feed screw rotary drive 10 and the drive gearwheel 12. In the region of the drive gearwheel 12, the feed screw 9 is axially and radially mounted to a frame housing 13 of the silicone extrusion plant 1. The feed screw rotary drive 10 allows the feed screw 9 to be driven for rotation about its longitudinal axis $9_L$ (see directional arrow $9_D$ in FIG. 4). In the embodiment according to FIGS. 1 to 3, the longitudinal axis $9_L$ of the feed screw 9 runs at an angle relative to the vertical, said angle being the angle $\alpha_A$ of the hopper 5, while in the embodiment according to FIG. 4, it is horizontal.

The screw portion 9a of the feed screw 9 near the drive end is arranged adjacent to a hopper wall 14 of the feed hopper 5. A distance between the screw portion 9a near the drive end and the hopper wall 14 is smaller than 1 mm.

The feed hopper 5 is configured such as to be drivable for rotation as well. A feed hopper rotary drive 15 acts, via an angular gear unit 16, on a drive gearwheel of the feed hopper 5. Near the feed opening 6, the feed hopper 5 is again mounted axially and radially in relation to the frame housing 13. The feed hopper rotary drive 15 allows the feed hopper 5 to be driven for rotation about its cone symmetry axis $5_K$ (see directional arrow $5_D$ in FIG. 4).

The two rotary drives 10, 15 for the feed screw 9 on the one hand and for the feed hopper 5 on the other are independent of each other. In an alternative embodiment of the silicone extrusion plant 1, it is conceivable to provide exactly one common drive for the feed screw 9 on the one hand and the feed hopper 5 on the other, wherein a predefined speed ratio between a feed screw speed on the one hand and a feed hopper speed on the other is definable by means of a step-up gear unit or a reduction gear unit of a common drive of this type. The rotary drives 10, 15 or the common drive may be configured as a synchronous motor.

The feed device 3 is cooled with cooling water, which may be circulated in a cycle.

FIG. 1 shows the feed device 3 in a feeding position, in other words in an operating position allowing the silicone material to be extruded to be fed—via the feed box 4, the feed hopper 5, the feed opening 6 and the feed duct 7—to the inlet zone 8 of the silicone extruder 2.

FIG. 2 shows the feed device 3 in a cleaning or maintenance position, which is displaced in relation to the feeding position according to FIG. 1. In the cleaning or maintenance position, the feed device 3 is pivoted out in relation to the feeding position about a vertical pivot axis 3s on the one hand and displaced in a linearly downward direction along this pivot axis 3s on the other. Both the pivoting movement and the displacement movement are guided in a displacement frame portion 17 of the frame housing 13.

To prepare the pivoting movement of the feed device 3 into the cleaning or maintenance position, a flange connection 18 is loosened between two portions of the feed duct 7.

The silicone extrusion plant 1 has a central control device 19 with an operating terminal 20 (see FIG. 1). The control device 19 is in a signal communication with the two rotary drives 10, 15.

A feed pressure sensor 21 (see FIG. 3) is arranged in a transition region between the silicone feed device 3 and the silicone extruder 2, in other words in the region of the feed duct 7. Said feed pressures sensor 21 is used to measure an actual feed pressure of the silicone material to be extruded. The pressure sensor 21 is arranged in such a way that a sensor signal of the pressure sensor 21 to control a pressure of the silicone material to be extruded may be generated directly in front of the inlet zone 8 of the extruder 2. For this purpose, the pressure sensor 21 can be arranged directly adjacent to the inlet zone 8 as shown in FIG. 3. The arrangement of the pressure sensor 21 in relation to the inlet zone 8 may in particular be such that between the arrangement position of the pressure sensor 21 and the inlet zone 8, no other component for influencing the pressure of the silicone material is arranged in the conveying path of the silicone material towards the extruder 2.

Part of the control device 19 is formed by a control unit 22 outlined schematically in FIG. 1 (see also the signal processing diagram as shown in FIG. 5), which is in signal communication with the feed pressure sensor 21 and the feed drive device, in other words the feed rotary drive 10 and/or the feed hopper rotary drive 15. The control unit 22 is used to define a nominal feed pressure and to transmit an actuating signal to the feed drive unit 10 depending on a difference detected between the actual feed pressure and the nominal feed pressure.

Furthermore, a feed temperature sensor 23 configured to measure an actual feed temperature of the silicone material to be extruded is arranged in the transition region 7. The feed temperature sensor 23 is in signal communication with the control unit 22.

Furthermore, the silicone extrusion plant 1 has a tool head pressure sensor 25 in a tool head 24 of the silicone extruder 2, which is shown schematically in FIGS. 1 and 2 and is arranged in the region of a discharge zone of the silicone extruder 2. Said tool head pressure sensor 25 is used to measure an actual discharge pressure of the silicone material to be extruded. The control unit 22 is in signal communication with the tool head pressure sensor 25 and an extruder drive unit 26. The extruder drive unit 26 is used to drive at least one extruder screw, which runs in a housing cylinder 27 of the silicone extruder 2. The control unit 22 is further used to define a nominal discharge pressure of the silicone material to be extruded and to transmit a respective actuating signal to the extruder drive unit 26 depending on a difference detected between the nominal discharge pressure and the actual discharge pressure.

The silicone extrusion plant 1 further has a discharge temperature sensor 28, which is also arranged in the tool head 24 of the silicone extruder 2. The discharge temperature sensor 28 is used to measure an actual discharge temperature of the silicone material to be extruded. The discharge temperature sensor 28 is in signal communication with the control unit 22.

In alternative embodiments of the silicone extrusion plant 1, it is conceivable as well to use more than one feed pressure sensor 21 and/or more than one feed temperature sensor 23 and/or more than one tool head pressure sensor 25 and/or more than one discharge pressure sensor 28. It is in particular conceivable to arrange different temperature sensors 28 in different temperature zones of the silicone extruder 2.

A temperature in the at least one temperature zone in the conveying path of the silicone material of the silicone extrusion plant 1 may be set by means of a temperature controlling medium. For example, the temperature of the feed hopper 5 and/or the feed duct 7 and/or the extruder 2 can be controlled, and in particular cooled, actively using a temperature controlling medium such as water.

Another control variable, which may be kept on a constant level by comparing a measured actual value with a predetermined nominal value by means of the control unit 22, is a silicone throughput in the conveying path of the silicone extrusion plant 1. This throughput can be measured at various positions of the entire conveying path between the feed device 3 and the tool head 24.

When performing a silicone extrusion with the silicone extrusion plant 1, the silicone material to be extruded is, in a first step, loaded into silicone feed device 3. Then the silicone material to be extruded is conveyed through the silicone feed device 3 and the silicone extruder 2. The extrudate thus produced is then discharged from the silicone extruder 2. During a controlled operation of the silicone extrusion plant 1, the silicone material is conveyed through the silicone feed device 3 and the silicone extruder 2 in a controlled manner using the actuating signals of the control unit 22. These actuating signals of the control unit 22 may act on the feed hopper rotary drive 15 and/or on the screw rotary drive 10 and/or on the extruder drive unit 26 and/or on actuating components of the tool head 24. Depending on the sensor measurements, it is thus possible, for example, to define a rotational speed of the feed hopper 5, a rotational speed of the feed screw 9 and/or a screw speed of the extruder 2 or it is possible to define actuating variables of adjustable components of the tool head 24. Drives of the silicone extrusion plant 1, in particular the rotary drives 10, 15 and the extrusion drive 26, may be configured such as to be infinitely variable.

FIG. 6 shows a schematic view of another embodiment of the silicone feed device. Components and functions, in particular also those of the control equipment, which are equal to those of the embodiment according to FIGS. 1 to 5, carry the same reference numerals in FIG. 6 and are not explained in detail again if they have already been described with reference to FIGS. 1 to 5.

In the feed device according to FIG. 6, the feed screw 9 has a conical envelope portion $9_K$, which is also referred to as cone portion, and a cylindrical envelope portion $9_Z$, which is also referred to as cylinder portion. The cone portion $9_K$ of the feed screw 9 is arranged in the feed hopper 5. The cylinder portion $9_Z$ is arranged in the feed duct 7.

An outer wall region 31 of the cone portion $9_K$ effective in the loading of the feed hopper 5 has a screw cone angle $\alpha_B$, which is measured between the cone symmetry axis $5_K$ of the feed hopper 5 and an intersecting line of this outer wall region 31 in the longitudinal sectional view according to FIG. 6. This screw cone angle $\alpha_B$ is greater than the hopper cone angle $\alpha_A$, as is illustrated by the comparison of these two angles in FIG. 6. In other words, the two angles $\alpha_A$ and $\alpha_B$ are different from one another.

FIG. 6 shows another embodiment of the feed screw 9, which is illustrated by dashed lines, having a cone body $9_K$ with a cylindrical base body. A screw cone angle $\alpha_{B'}$ between the cone symmetry axis $5_K$ and an intersecting line of an outer wall region 32 of this alternative embodiment is, in this case, smaller than the hopper cone angle $\alpha_S$. A difference between the two angles $\alpha_A$, $\alpha_B$ or $\alpha_A$, $\alpha_{B'}$, respectively, is greater than 0.5° and smaller than 10°. The difference can be smaller than 5° and can in particular be in the range of between 1° and 3°.

The various possibilities of designing the cone portion, which may be configured such as to have a cylindrical or conical base body, and the possibility of setting a cone angle of the conical envelope of the cone portion $9_K$ allow a path of a thread depth of a screw thread 33 of the cone portion $9_K$ to be defined in a correspondingly flexible manner along the direction of conveyance of the silicone material. In a configuration of the cone portion $9_K$ illustrated by continuous lines in FIG. 6, said thread depth of the screw thread 33 increases in the direction of conveyance of the silicone material. In the configuration illustrated by dashed lines, the thread depth of the screw thread in the inlet zone of the cone portion $9_K$ is maximal and reduces in the direction of conveyance of the feed screw 9. This variability when defining the thread depth allows the conveying effect of the feed screw 9 to be adapted to the respective conveying requirements.

Along the feed screw 9, the cone portion $9_K$ has a length $L_K$ and the cylinder portion $9_Z$ has a length $L_Z$. A length ratio $L_K/L_Z$ between the cone portion $9_K$ and the cylinder portion $9_Z$ is such that said length ratio $L_K/L_Z$ is in the range of between 1 and 3, in other words the cone portion $9_K$ is thus longer than the cylinder portion $9_K$. In the embodiment shown in FIG. 6, this length ratio $L_K/L_Z$ is in the range of 1.6. This length ratio $L_K/L_Z$ may be between 1.5 and 2.5, and may be between 1.55 and 2.

The cylinder portion $9_Z$ including the screw thread 33 has an external diameter of $D_Z$. The cone portion $9_K$, including the screw thread 33, has a maximum external diameter of $D_K$.

A dimensional ratio $L_Z/D_Z$ between the length $L_Z$ and the diameter $D_Z$ of the cylinder portion $9_Z$ is such that this dimensional ratio $L_Z/D_Z$ may be in the range of between 3 and 5, and in particular in the range of 4. A ratio $L_K/D_Z$ between the length $L_K$ of the cone portion $9_K$ and the diameter $D_Z$ of the cylinder portion $9_Z$ may be in the range of between 6 and 8, and may in particular be in the range of 7. A diameter ratio $D_K/D_Z$ between the cone portion $9_K$ and the cylinder portion $9_Z$ may be in the range of between 1 and 2, and may in particular be in the range of 1.5.

The screw thread 33 may be configured such as to have a profile cross-section with thread faces arranged parallel to one another, wherein one of which applies a feed pressure to the silicone material in the rotary operation of the feed screw 9. Alternatively, the cross-sectional profile of the screw thread 33 may be configured such as to increase towards the transition in the screw base body to increase a stability of the screw thread 33. A feed wall of the screw thread 33, which applies the feed pressure to the silicone material, may be arranged in such a way as to run substantially perpendicular to the respective outer wall 31 or 32 of the feed screw. A stabilizing wall of the screw thread 33 arranged opposite the feed wall may be configured such as to run at a corresponding angle thereto and may run into the respective outer wall 31 or 32 at an obtuse angle in the range of between 110° and 170°, particularly in the range of between 130° and 140°, for example.

A distance between two adjacent flights or ridges of the screw thread 33 may be such that the following applies: This ridge distance may have a value SA1 in the region of the cylinder portion $9_Z$, a value SA2 in the region of the transition between the cylinder portion $9_Z$ and the cone portion $9_K$, and a value SA 3 at the inlet end of the cone portion $9_K$. The dimensional ratio of these ridge distances may be such that SA1<SA2 and/or SA2<SA3, in particular SA1<SA2<SA3.

The ratio SA2/SA1 may be in the range of between 1.1 and 1.5, and in particular in the range of 1.3. The ratio SA3/SA2 may also be in the range of between 1.1 and 1.5, and in particular in the range of 1.3. The ratio SA3/SA1 may be in the range of between 1.2 and 2, and in particular in the range of 1.5.

The extrusion method using the silicone extrusion plant 1 allows a silicone extrudate in the shape of a tube, a hollow profile or a solid profile to be produced.

What is claimed is:

1. A silicone extrusion plant comprising:
   a silicone extruder;
   a silicone feed device configured to load the silicone extruder, the silicone feed device having a feed hopper which opens into a feed opening disposed at the bottom thereof, said feed opening being in a fluidic connection, via a feed duct, with an inlet zone of the silicone extruder, and
   a feed screw being arranged in the feed hopper in such a way as to be drivable for rotation, the feed screw protruding into the feed opening at least partly,
   wherein parts of the feed screw have a conical envelope,
   wherein parts of the feed screw have a cylindrical envelope,
   wherein a cone portion of the feed screw having the conical envelope is arranged in the feed hopper,
   wherein a cylindrical portion of the feed screw having the cylindrical envelope is arranged in the feed duct; and
   wherein the feed hopper is drivable for rotation.

2. The silicone extrusion plant as claimed in claim 1, wherein the feed screw is arranged adjacent to a hopper wall of the feed hopper.

3. The silicone extrusion plant as claimed in claim 1, wherein a screw cone angle ($\alpha_B$) of the conical envelope portion differs from a hopper cone angle ($\alpha_A$) of the feed hopper.

4. The silicone extrusion plant as claimed in claim 1, wherein a length ratio $L_K/L_Z$ between the conical envelope portion and the cylindrical envelope portion is in the range of between 1 and 3.

5. The silicone extrusion plant as claimed in claim 1, comprising a feed screw rotary drive and a feed hopper rotary drive, with the rotary drives being configured independently of one another.

6. The silicone extrusion plant as claimed in claim 5, further comprising a control device, which is in a signal communication with the rotary drives.

7. A silicone extrusion plant comprising
   a silicone extruder;
      a silicone feed device configured to load the silicone extruder;
   at least one feed drive device configured to drive the silicone feed device;
   at least one feed pressure sensor configured to measure an actual feed pressure of silicone material to be extruded, the feed pressure sensor being arranged in a transition region between the silicone feed device and the silicone extruder; and
   a control unit, which is in signal communication with the feed pressure sensor and the feed drive device, which is configured to define a nominal feed pressure, and which is configured to transmit an actuating signal to the feed drive device depending on a difference detected between the nominal feed pressure and the actual feed pressure,
   at least one feeding temperature sensor that is configured to measure an actual feeding temperature of the silicone material to be extruded, the feeding temperature sensor being arranged in a transition region between the silicone feed device and the silicone extruder, and the feeding temperature sensor being in signal communication with the control unit, and
   a feed screw rotary drive and a feed hopper rotary drive, with the feed screw rotary drive being configured independently of the feed hopper rotary drive.

8. The silicone extrusion plant as claimed in claim 7, further comprising at least one tool head pressure sensor configured to measure an actual discharge pressure of silicone material to be extruded, the tool head pressure sensor being arranged in a tool head in the region of a discharge zone of the silicone extruder,
   wherein the control unit is in signal communication with the tool head pressure sensor and an extruder drive unit in order to drive an extruder screw, to set a nominal discharge pressure, and to transmit an actuating signal to the extruder drive unit depending on a difference detected between the nominal discharge pressure and the actual discharge pressure.

9. The silicone extrusion plant as claimed in claim 7, further comprising at least one discharge temperature sensor which is configured to measure an actual discharge temperature of the silicone material to be extruded, the discharge temperature sensor being arranged in the tool head of the silicone extruder, and the discharge temperature sensor being in signal communication with the control unit.

* * * * *